June 4, 1968  L. PEASE  3,386,564
FEED TABLE
Filed April 23, 1965  10 Sheets-Sheet 1
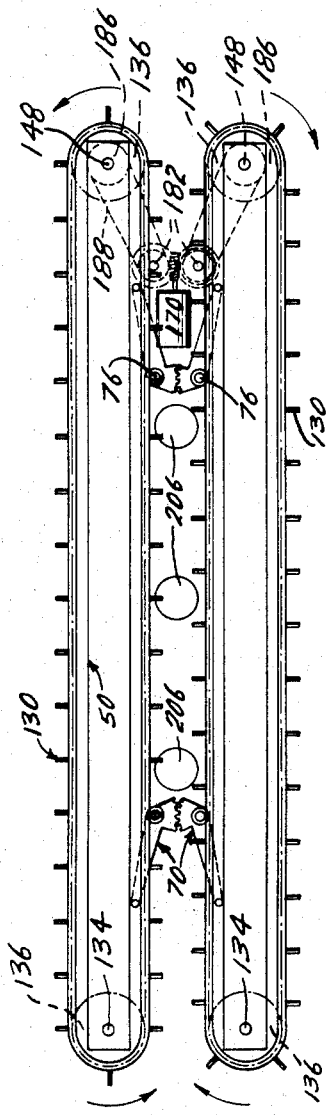
Fig.1
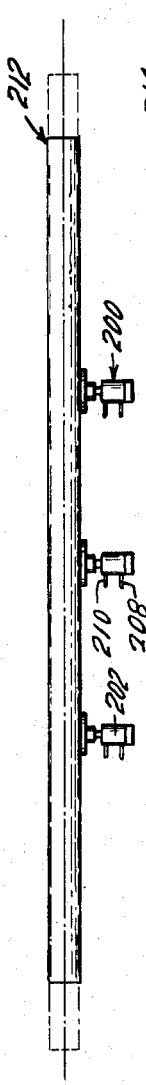
Fig.2
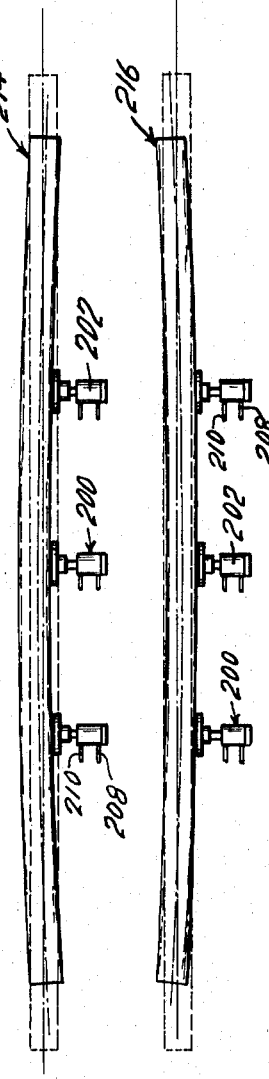
Fig.3
Fig.4
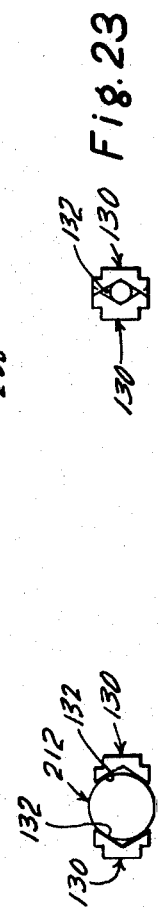
Fig.23
Fig.5
INVENTOR.
Lionel Pease
BY
TW Secrest June 4, 1968   L. PEASE   3,386,564
FEED TABLE
Filed April 23, 1965   10 Sheets-Sheet 2

INVENTOR.
Lionel Pease
BY
T W Secrest

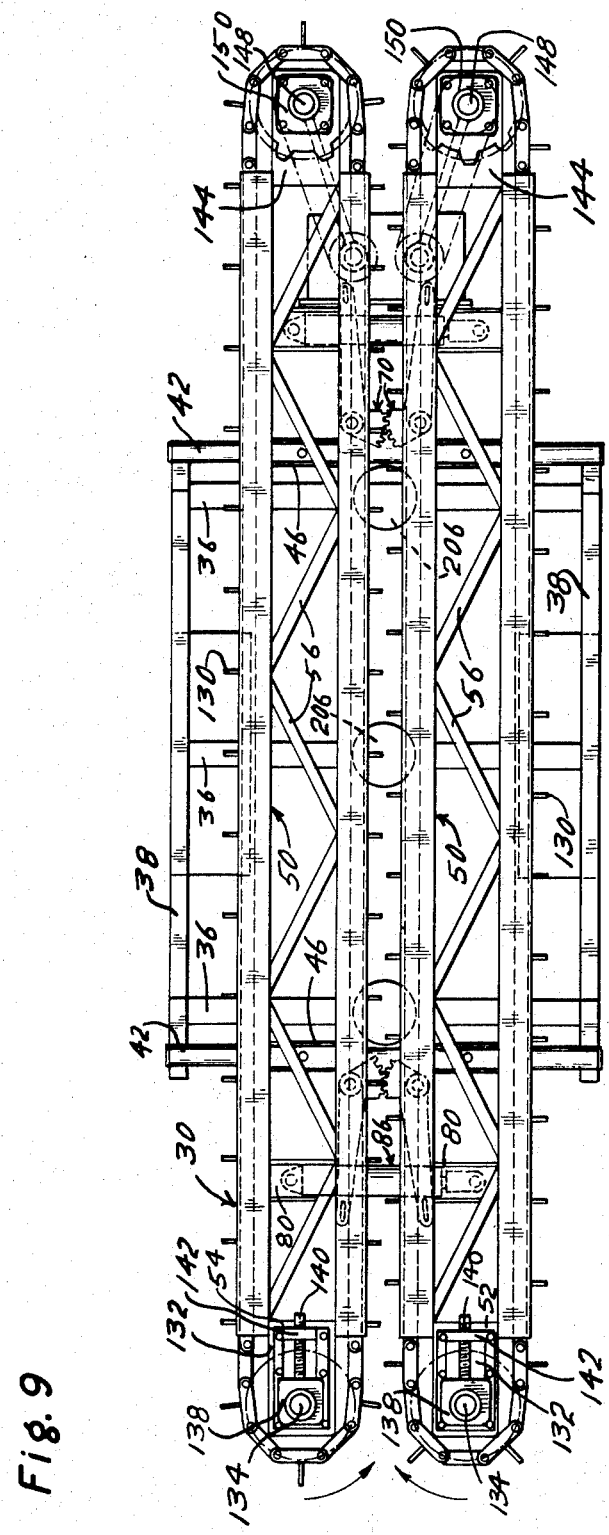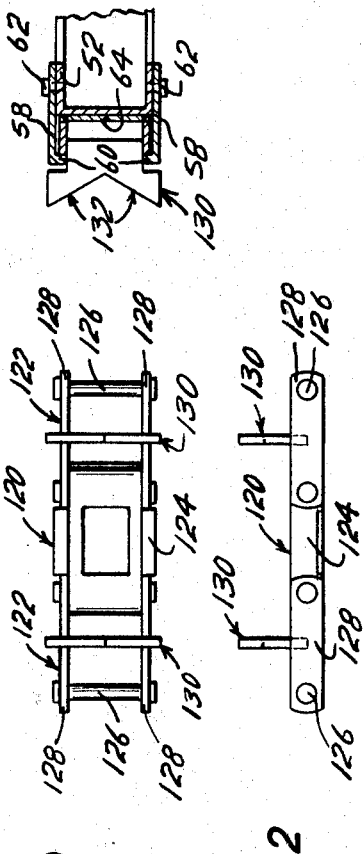

June 4, 1968
L. PEASE
3,386,564
FEED TABLE
Filed April 23, 1965
10 Sheets-Sheet 4
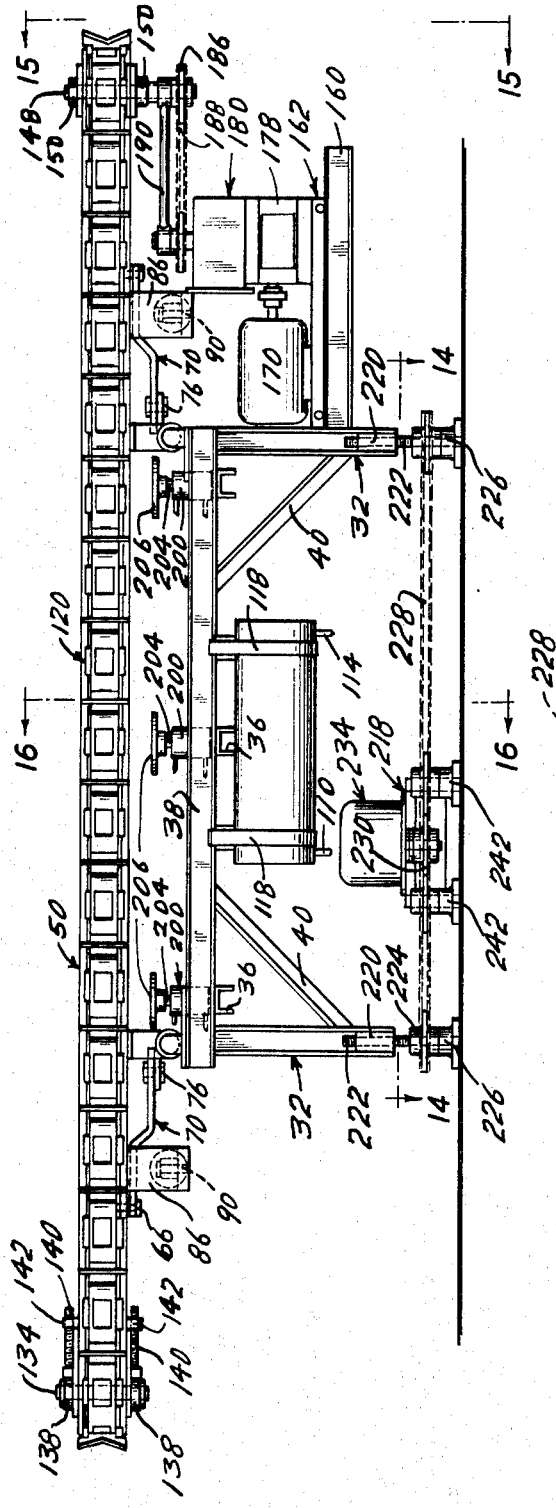
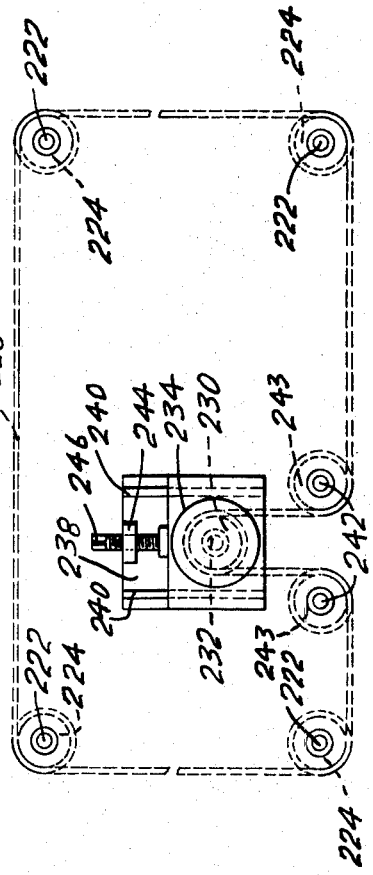
INVENTOR.
Lionel Pease
BY
TW Secrest INVENTOR.
BY Lionel Pease
TW Secrest June 4, 1968 L. PEASE 3,386,564
FEED TABLE
Filed April 23, 1965 10 Sheets-Sheet 6

INVENTOR.
Lionel Pease
BY
JW Secrest

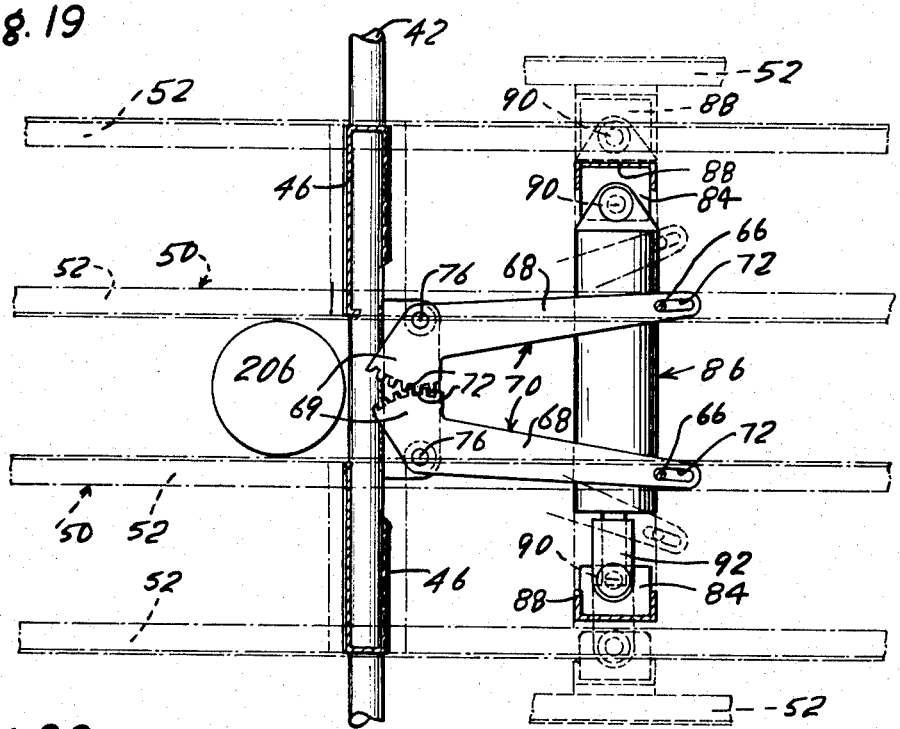
Fig.19
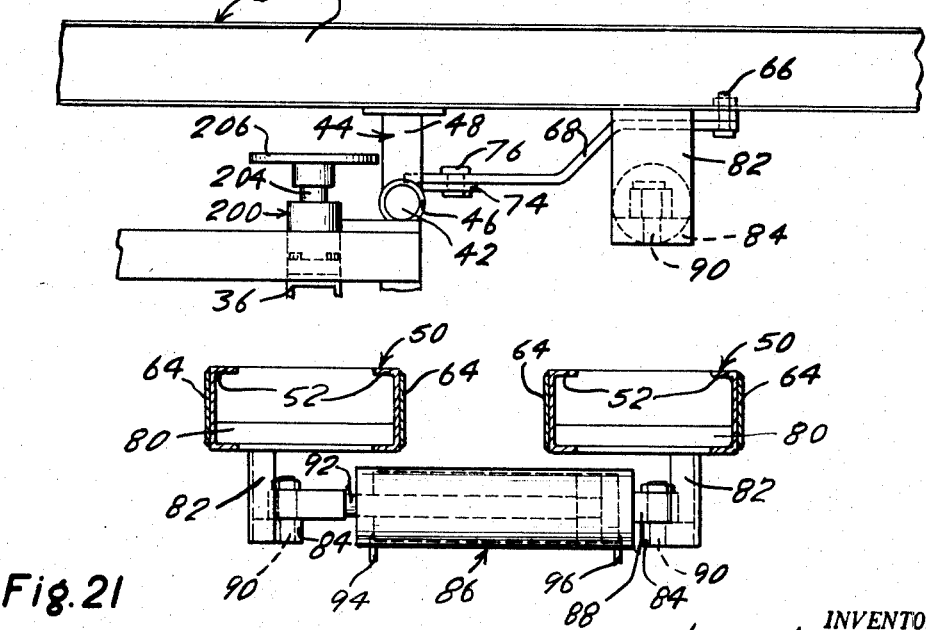
Fig.20
Fig.21
INVENTOR.
Lionel Pease
BY
TW Secrest

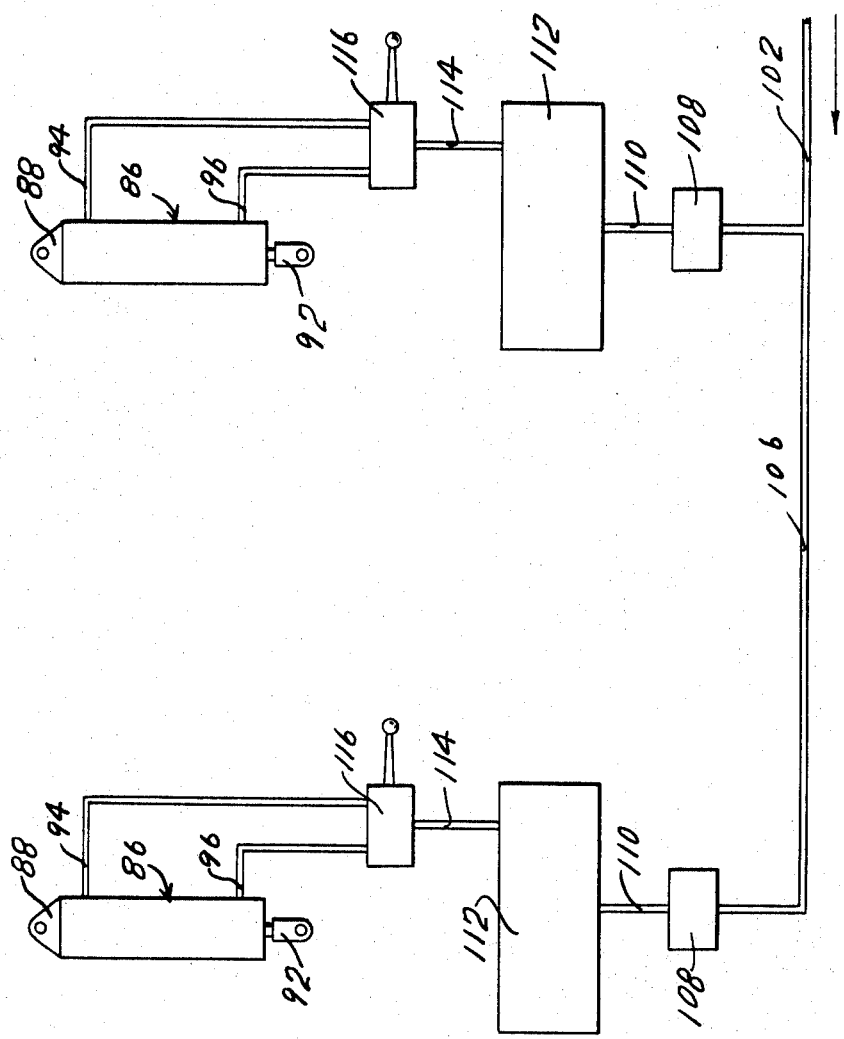

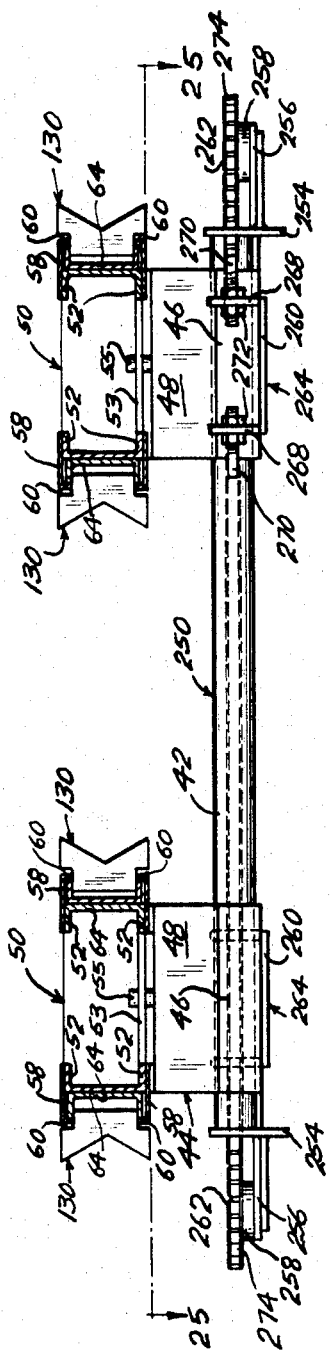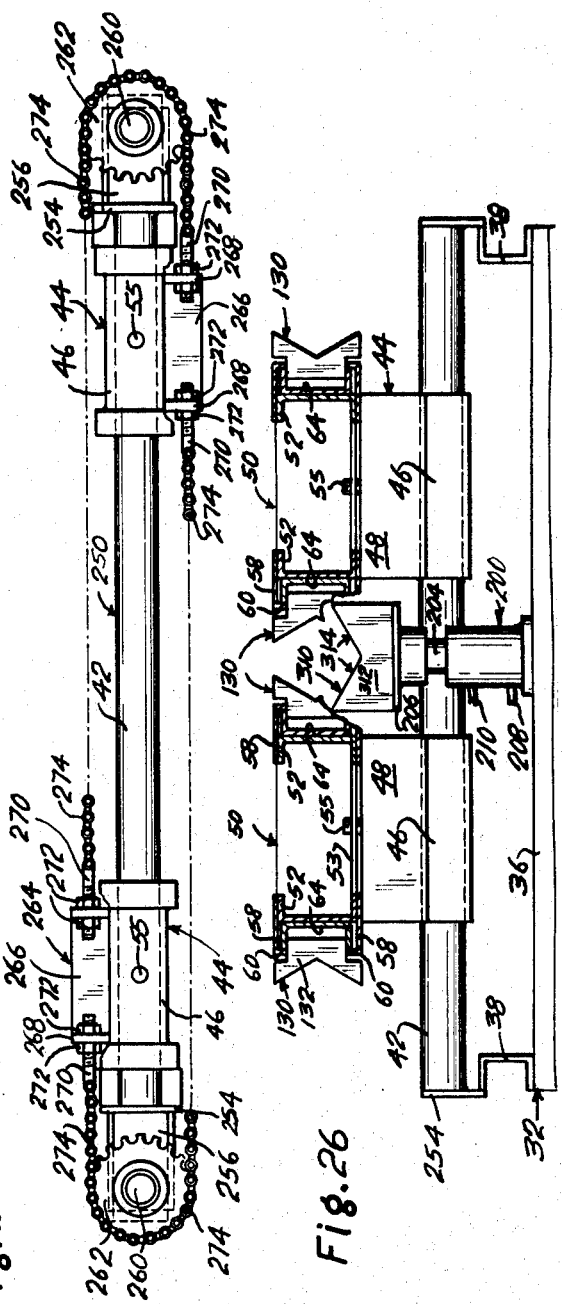

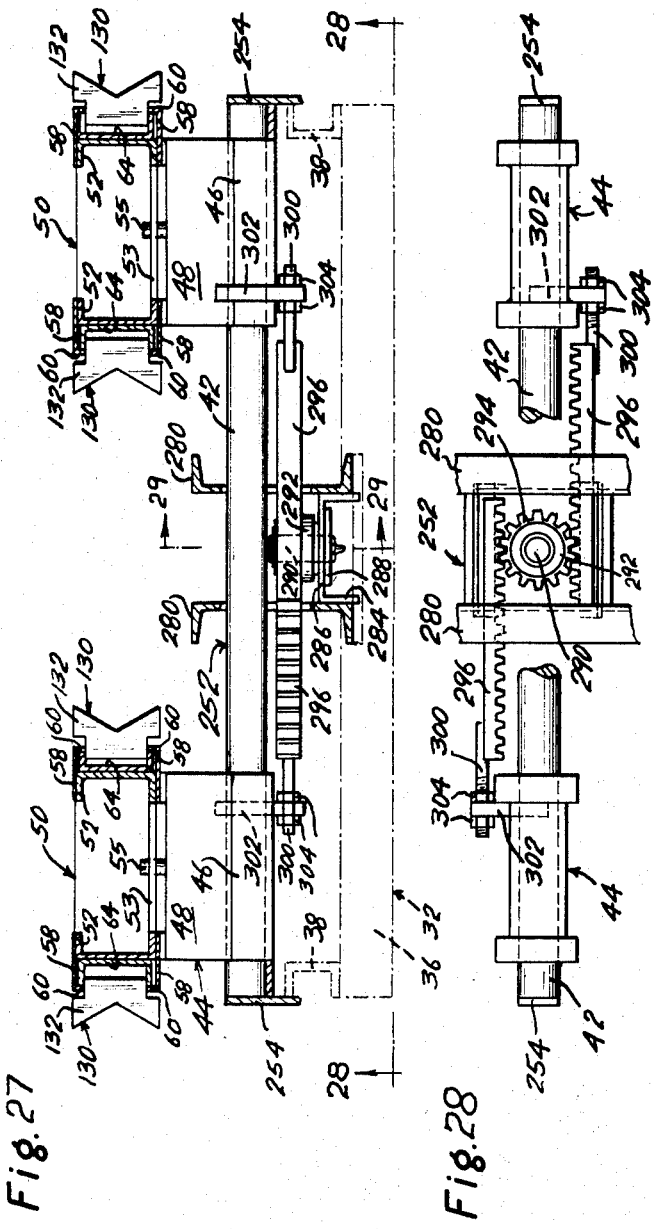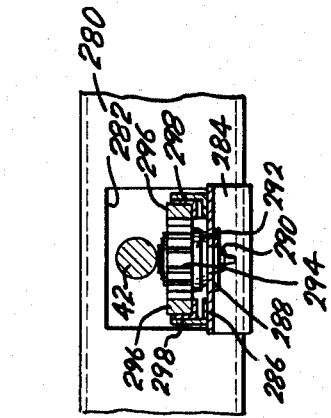
Fig.27 Fig.28 Fig.29
INVENTOR
Lionel Pease
TW Secrest
ATTORNEY United States Patent Office 3,386,564
Patented June 4, 1968

3,386,564
FEED TABLE
Lionel Pease, Seattle, Wash., assignor, by mesne assignments, to Thomas W. Secrest, Seattle, Wash., as trustee of the Creditors Committee of Mill Equipment Inc.
Continuation-in-part of abandoned application Ser. No. 339,504, Jan. 22, 1964. This application Apr. 23, 1965, Ser. No. 456,019
12 Claims. (Cl. 198—162)

ABSTRACT OF THE DISCLOSURE

This invention relates to a feed table or a feed mechanism for introducing small logs to log processing equipment. The feed table has means to accommodate logs of various sizes and configurations.

Figure 6:
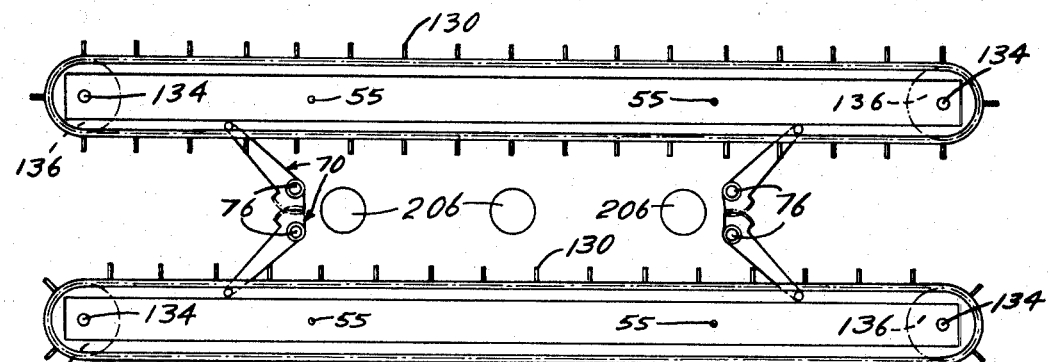

This application is a continuation-in-part of United States patent application Ser. No. 339,504, filing date of Jan. 22, 1964 and now abandoned.

The processing of small logs having a diameter in the range of three and one-half inches to twenty-four inches (3.5"–24") is becoming more and more important, and, also, is requiring especially designed equipment. Previously, the small log was used only infrequently or not utilized at all. Upon the felling of a large tree, and if a small tree were also felled, the small log was allowed to rot. In some instances, because of prevailing law, a cutover area had to be burned and small trees which were left standing perished in the burning. Due to the decrease of large trees and large logs, there is necessitated the use of small logs for the manufacture of building materials. In some instances, a small log which is capable of producing only one or two two-inch by four-inch (2" x 4") cants is processed to produce these building materials. This invention is concerned with the feeding of small logs to other processing equipment. This feed table must be capable of handling logs of different diameters, a log of varying diameter from butt end to tip end, logs which are straight and logs which are curved; must be capable of feeding logs at a constant speed to the processing equipment, and must be capable of centering the log for the processing equipment. Accordingly, I have invented a feed table which may accommodate logs of different diameters; which may accommodate logs of varying diameters; which may accommodate logs of varying shapes from a substantially straight log to a curved log; a feed table which is capable of spreading apart the carrier chains entirely or only at one end; a feed table which may be operated at a horizontal position or at a vertical position or in an inverted position or at an angle in between an inverted position and a horizontal position; a feed table which can be changed in position to accommodate different logs or to operate under different conditions; a feed table which is capable of feeding logs at a constant speed to another apparatus for processing small logs; and, a feed table which is capable of centering logs for the subsequent processing equipment.

These and other important objects and advantages of the invention will be more particularly brought forth upon reference to the accompanying drawings, the detailed specification of the invention and the appended claims.

Figure 7:
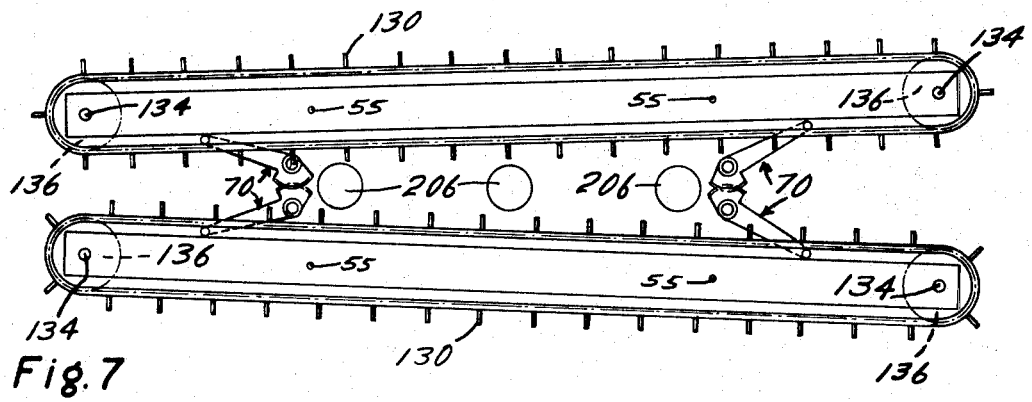
Figure 8:
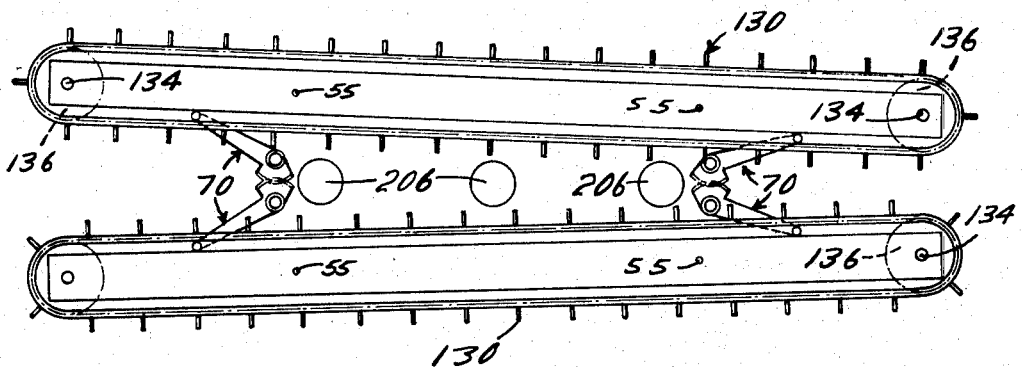
Figure 16:
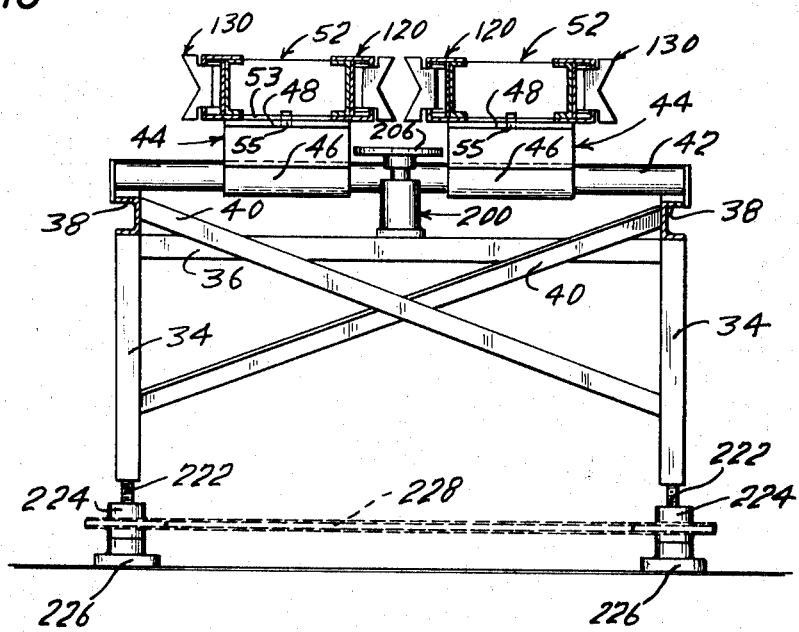
Figure 15:
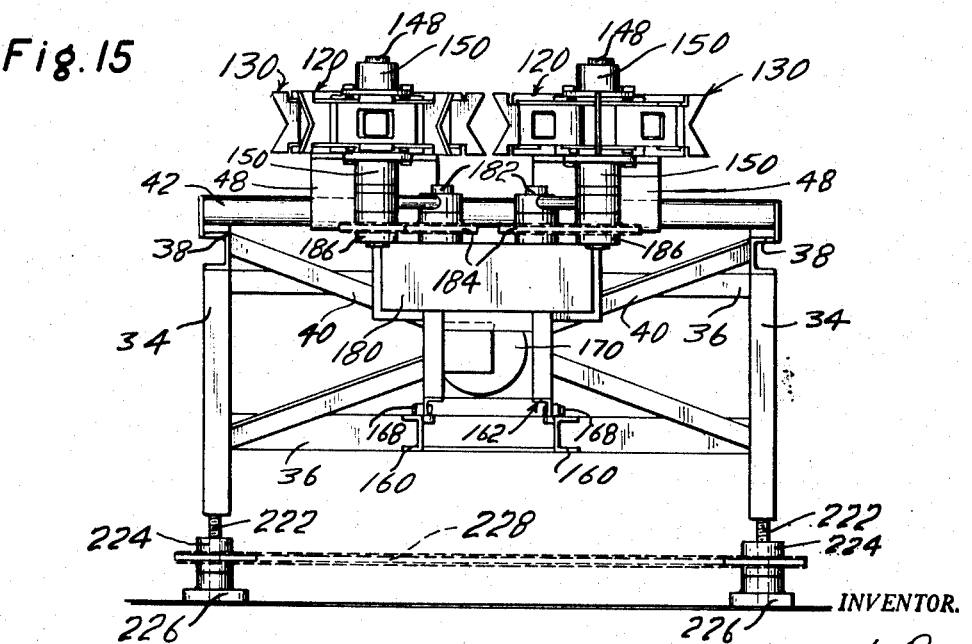
Figure 18:
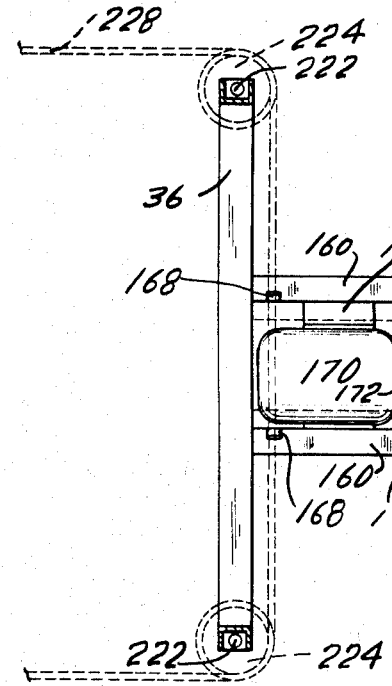
Figure 17:
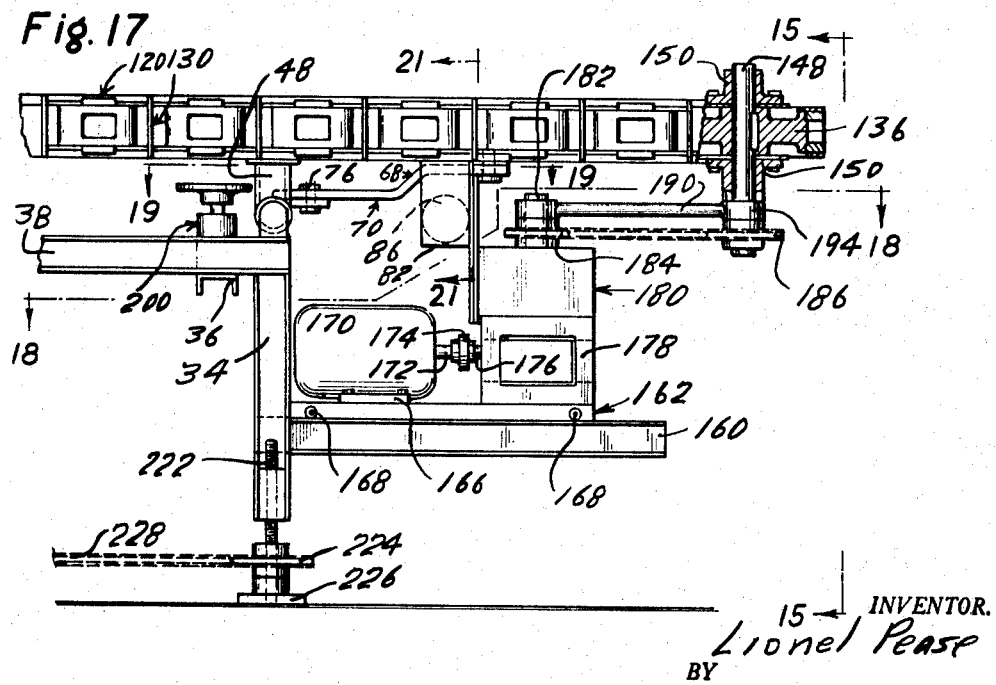

In the drawings:
FIGURE 1 is a schematic plan view of the feed table;
FIGURE 2 is a schematic view illustrating a substantially straight log supported on three log lifting pads;
FIGURE 3 is a schematic view illustrating a curved log supported on three log lifting pads and with the central pad elevated above the two end pads;

FIGURE 4 is a schematic side-elevational view of a curved log supported on the three pads and with the two end pads elevated above the center pad;
FIGURE 5 is a schematic end-elevational view illustrating a log positioned between carrier plates carried by the carrier chain;
FIGURE 6 is a plan view looking down on both carrier chains completely separated for their entire length;
FIGURE 7 is a plan view looking down on the carrier chains and close together at the left end or the intake end and separated at the right or the discharge end;
FIGURE 8 is a plan view looking down on both carrier chains and which carrier chains are spaced-apart at the left end or the intake end and close together at the right end or the discharge end;
FIGURE 9 is a plan view of the feed table and shows the carrier chains close together and the carrier plates overlapping;
FIGURE 10, on an enlarged scale, is a side-elevational view of the two lengths of the carrier chain and shows the carrier plate;
FIGURE 11 is a fragmentary end-elevational view of a link in the carrier chain and illustrates the carrier plate;
FIGURE 12 is a plan view looking down on the two adjacent lengths of the carrier chain and illustrates the carrier plate;
FIGURE 13 is a side-elevational view of the feed table;
FIGURE 14, taken on line 14—14 of FIGURE 13, is a cross-sectional view illustrating a mechanism for changing the position of the feed table such as raising and lowering the feed table;
FIGURE 15, taken on line 15—15 of FIGURE 13, is an end-elevational view of the feed table;
FIGURE 16, taken on line 16—16 of FIGURE 13, is a lateral vertical cross-sectional view of the feed table;
FIGURE 17, on an enlarged scale, is a fragmentary side-elevational view of the end of the feed table and illustrates the means for driving the carrier chains;
FIGURE 18, taken on line 18—18 of FIGURE 17, is a horizontal lateral cross-sectional view and illustrates the means for driving the carrier chains;
FIGURE 19, taken on line 19—19 of FIGURE 17, is a horizontal lateral cross-sectional view and illustrates the sector gears to maintain each carrier chain equidistant from the center line of the machine regardless of the opening between the chains;
FIGURE 20 is a longitudinal vertical cross-sectional view illustrating the sector gears and, also, a log lifting pad;
FIGURE 21, taken on line 21—21 of FIGURE 17, is a lateral vertical cross-sectional view of the feed table and shows the carrier chain support-structure assembly and part of the sector gears for moving said support-structure assemblies relative to each other;
FIGURE 22 is a schematic illustration of a fluid system for cylinders associated with the sector gears for moving the two carrier chain support-structure assemblies relative to each other;
FIGURE 23 is a schematic end-elevational view illustrating a log positioned between carrier plates and which carrier plates overlap;
FIGURES 24 and 25 relate to the same drive assembly wherein FIGURE 24 is a fragmentary elevational view illustrating a chain drive assembly for maintaining the carrier chains equidistant from the center line of the machine;
FIGURE 25, taken on line 25—25 of FIGURE 24, is a fragmentary plan view of the chain drive assembly and illustrates the chains and sprocket for moving the tiedown member;
FIGURE 26 is a lateral vertical cross-sectional view illustrating the carrier chain and a lock stopper on a log lifting pad;

FIGURES 27, 28, and 29 relate to a rack drive assembly for the carrier chains, wherein FIGURE 27 is an elevational view illustrating the rack members for moving the carrier chains equidistant from the center line of the machine;

FIGURE 28, taken on line 28—28 of FIGURE 27, is a fragmentary plan view looking down on the rack and spur gear for moving the carrier chains equidistant from the center line of the machine; and FIGURE 29, taken on line 29—29 of FIGURE 27, is a longitudinal vertical cross-sectional view of the spur gear.

In the drawings, FIGURE 1 is a schematic plan view of the invention or feed table 30. FIGURE 9 is a plan view of the feed table 30. In FIGURES 9, 13, 15 and 16, it is seen that the feed table comprises a support-structure assembly 32 having four spaced-apart legs 34. Each pair of legs 34 is joined by an upper rail 36 and each pair of side legs 34 is joined by an upper rail on side-channel member 38. There are cross braces 40 connecting the legs 34 to the side-channel rails 38. Near the ends of the side-channel rails 38 and running on the upper part of these two rails are two cylindrical tubes or shafts 42. These tubes are positioned on a lateral axis with respect to the movement of the logs and may be welded onto the upper part of the rails 38. On the two spaced-apart tubular members 42 there is positioned a sliding tie-down member 44 having a cylindrical member 46 which fits over the tubular members 42. On the upper part of the cylindrical member 46 there is an upright support 48. There are two spaced-apart sliding tie-down members 44 on each cylindrical rod or tubular member 42. In all, there are four sliding tie-down members 44 in the feed table 30.

In FIGURE 16 it is seen that the lower ends of the channel rail 52 are connected by a cross brace 53. And, on the upper part of the upright support 48 there is a pin 55. The pin 55 projects through a passageway in the cross brace 53. In this way the assembly 50 is free to rotate on the pin 55.

The aligned upright supports 48 on the two spaced-apart cylindrical rods or tubes 42 support a carrier chain support-structure assembly 50, see FIGURES 9, 13, 16, 19 and 20. It is seen that there are two such assemblies 50. These two assemblies are in an opposed relationship as will be more thoroughly explained. The assembly 50 comprises two longitudinal U-channel members 52 having their legs inwardly directed. The U-channel members 52 are tied together at their ends with end braces 54. There are also diagonal cross braces 56. On the outer surface of each of the legs of the U-channel 52 there is an outwardly directed plate 58. From FIGURE 11 it is seen that there are two outwardly directed plates 58 and the ends of these plates bend inwardly at a right angle to form a short leg 60. The plates 58 may be attached to the legs by means of a bolt or a rivet 62. On the outside of the base of the U-channel 52 there is a wear plate 64. In the lower leg of each inner U-channel member 52 and near the end thereof, there is positioned a bolt or a stub shaft 66. An arm 68 of a sector gear 70 connects with the bolt 66. This arm 68, near the end and juxtapositioned with respect to the bolt 66, has an elongated slot or opening 72. The arm 68 has a bend which allows it to bend away from the U-channel member 52. The arm 68 expands into an enlarged head 69 having gear teeth 72. The sector gear 70 attaches to a mounting plate 74. The mounting plate 74 is at the central portion of the cylindrical tubular member 42 and directed outwardly therefrom. The mounting bar 74 may be welded so as to be substantially flush with the upper surface of the cylindrical tubular member 42. The sector gear 70 and the mounting plate 74 may be united by a pin or bolt or rivet 76. It is seen that on each mounting plate 74 there are two sector gears 70 with their teeth 72 meshing. In all, with the carrier chain support-structure assemblies 50 there are associated two sets of two sector gears. The purpose of these sector gears is to assist in the positive movement and alignment of the carrier chain support-structure assemblies 50 upon moving toward and away from each other so as to maintain each carrier chain equidistant from the center line of the machine regardless of the opening between the carrier chains.

There are means for moving the two carrier chain support-structure assemblies 50 with respect to each other. In this regard see FIGURES 9, 13, 19, 20 and 21. It is seen that the two U-channel members 52 of the carrier chain support-structure assemblies 50 are joined near their ends by a support plate 80. Depending from the support plate 80 is a support channel 82. On the lower end of support channel 82 and directed inwardly therefrom is a tie plate 84. It is seen that the two support channels 82 and the two tie plates 84 are aligned. A fluid actuated cylinder 86 connects the two tie plates 84. More particularly, on one end of the fluid actuated cylinder 86 there is a tie member 88. A bolt or stub shaft 90 connects with the tie plate 84 and, also, connects with the tie member 88. A nut may be screwed onto the upper end of the bolt 90. Projecting out of the fluid actuated cylinder 86 is a plunger 92. This plunger 92 fits with a bolt or stub shaft 90 on the other tie plate 84. A nut may be screwed onto the upper end of this bolt 90. The fluid actuated cylinder 86 has two fluid-pressure lines 94 and 96, one at each end. Of course, as is readily appreciated, the extension of the plunger 92 will separate the two assemblies 50 and the retraction of the plunger 92 will bring toward each other the two assemblies 50.

In FIGURE 22 there is illustrated the fluid-pressure system for operating the two fluid cylinders 86. This fluid-pressure system is a pneumatic system and operates on a gas pressure. A pipe 102 connects with the source of air pressure, not shown. This pipe 102 branches into a pipe or tube 104 and a pipe or tube 106. The tubes 104 and 106 each connect with a pressure regulator 108. Each pressure regulator 108 connects by means of a pipe 110 with a receiver 112. The pressure in the regulator is somewhat less than the pressure of the source of air pressure. Each of the receivers 112 connects by means of a pipe 114 with a valve 116. Each valve 116 connects by means of two tubes 94 and 96 with a fluid-pressure cylinder 86. This pneumatic system makes it possible to maintain substantially constant or specific pressure in the fluid cylinders 86 and on the plunger 92 so as to get a fixed pressure or force regardless of the position of the piston and plunger. It is possible for the piston and the plunger to move and for the carrier chain to still maintain a grip or hold on the log regardless of the variation in the diameter of log. This combination of parts makes it possible to maintain an essentially constant pressure on the piston and plunger. This is made possible because of the pressure regulator 108 and the receiver 112. The capacity of the receiver 112 is so large compared with the capacity of the fluid actuated cylinder 86 that it is possible to let air pass from the receiver to the fluid actuated cylinder 86 without substantially altering the pneumatic pressure in the receiver 112. The valve 116 may be vented to the atmosphere so that upon extending the plunger 92 the tube 96 is actually vented to the atmosphere. Conversely, upon retracting the plunger 92, the tube 94 is vented to the atmosphere. Of course, there is a control means for controlling the valve and, as illustrated in FIGURE 22, there is schematically illustrated a handle for this purpose.

In FIGURE 13 it is seen that a receiver 112 may be positioned on the side braces 38 by means of straps 118.

The carrier chain support-structure assembly 50 carries a chain 120 having major links 122 and minor links 124. In regard to this chain 120 and means for moving the same, see FIGURES 9, 10, 11, 12, 13, and 17. The major links 122 have pivot pins 126 connected by side bars 128. On the side bars 128 there are positioned, such as by welding, carrier plates 130. It is seen that these carrier plates 130 are recessed at 132 for gripping a log. It is also seen that the side bars 128 of the chain 120 are positioned between the plates 58, the wear strip 64 and the lip 60.

On the intake end, see FIGURE 9, or the left end of the feed table 30 there is welded to the cross braces 54 an upper end plate and a lower end plate 132. In each of these end plates 132 there is a solt for receiving a shaft 134. On this shaft there is mounted a sprocket 136. This shaft is journaled in an upper bearing 138 and a lower bearing 138. The two bearings 138 connect with a screw rod or a threaded rod 140. The rods 140 extend through a tapped keeper 142. It is seen that by twisting and turning the rods 140 that it is possible to move the upper and lower bearings 138 so as to tension the chain 120. On the right or discharge end of the carrier chain support-structure assembly 50 there is positioned a second plate 144. There are two of these end plates 144, an upper end plate and a lower end plate. Again, there is a shaft 148 mounted in an upper bearing 150 and a lower bearing 150. Also, there is a sprocket 136 mounted on a shaft. The shaft 148 extends below the lower bearing 150. The end plate 144 does not have means for moving the bearings 150 and the shaft 148 so as to vary the tension on the chain 120.

The power means for moving the carrier chain 120 is illustrated in FIGURES 15, 17, and 18. It is seen that there is a lower end cross brace 36 connecting the legs 34 of the support table 32. Attached to the lower brace 36 are two outwardly directed U-channels 160. These U-channels are in a spaced-apart relation. The two U-channels 160 project outwardly from the discharge end of the feed table 30 and under the assemblies 50. There is a frame 162 comprising two spaced-apart base members 164 connected by a transverse plate 166. Also, near each outer end of the base members 164 there are rollers 168. These rollers permit the frame 162 to roll back and forth on the U-channels 160. On the transverse plate 166 there is positioned a motor 170. The output shaft 172 of the motor 170 connects by means of a gear coupling 174 with the input shaft 176 of the speed reducer 178. The speed reducer 178 may incorporate a worm-gear drive or a governor and a brake or an intertial escape mechanism so as to drive the chain 120 and the carrier plates 130 at a constant velocity without acceleration, viz., a non-overrunning feed. The speed reducer 178 connects with the change box assembly 180. In FIGURE 17 it is seen that the change box assembly 180 is positioned directly above the speed reducer 178. The change box assembly 180 has two output shafts 182. The output shafts 182 rotate in opposite directions because they are driving the two carrier chains 120 in opposite directions. Positioned on each of the output shafts 182 is an output sprocket 184. On the lower end of the shaft 148 is positioned an input sprocket 186. A chain 188 runs between the output sprocket 184 and the input sprocket 186. It is seen that the sprocket 136, which sprocket drives the carrier chain 120, is driven by the input sprocket 186, chain 188 and output sprocket 184 through the shaft 148. Also, there is a connector arm 190 between the output shaft 182 and the shaft 148. This connector arm 190 has a bearing member 192 associated with the output shaft 182 and a bearing member 194 associated with the shaft 148. This connector arm 190 maintains a constant distance between the output shaft 182 and the input shaft 148 so that the chain 188 can be in a positive driving relationship with the input sprocket 186. The operation of the power means is readily seen. Upon the separation of the two carrier chain support-structure assemblies 50, the platform 162 is pulled outwardly and away from the support table 32. Upon the inward movement of the carrier chain support-structure assemblies, the platform 162 is moved inwardly toward the support table 32. Also, if one of the support assemblies 50 moves away from the other support assembly 50 the connector arm 190 will rotate around the two shafts 148 and 182 as to maintain a constant distance between the two shafts.

Positioned at approximately the mid-point of each upper rail 36, and directed toward the carrier chain support-structure assemblies 50, is a log lifting pad 200. Actually, this log lifting pad 200 comprises a fluid actuated cylinder 202 having a plunger 204 and a circular plate 206 positioned on top of the plunger 204. This log lifting pad 200 is more particularly illustrated in FIGURES 2, 3, 4, 9, 13, and 17. It is seen that there are three of these log lifting pads 200. Connecting with the pads 200 are fluid-pressure lines 208 and 210.

In FIGURES 2, 3, and 4 there is illustrated the use of the log lifting pads 200. More particularly, a log 212 which is substantially straight may easily be positioned on the three pads 200. However, a log which is curved and has a high center and low ends, as illustrated by the log 214 may cause difficulty in the positioning between the carrier chains 120. Therefore, the log lifting pads 200 are of a special value. The two end pads 200 are operated together while the center pad operates independently. Here the two end pads 200 may be lowered with respect to the center pad or the center pad may be elevated with respect to the two end pads so as to accommodate the configuration of the log 214. In FIGURE 4 there is illustrated a log 216 having a low center and two high ends. In this instance the center log lfting pad 200 may be lowered with respect to the two end pads 200 which may be elevated. In this manner it is possible to accommodate the log between the carrier chains 120.

In FIGURE 5 there is illustrated in a log 212 positioned between the carrier plates 130. This illustrates how the recess 132 in the carrier plate assists the plate in receiving the log.

In FIGURES 6, 7, and 8 the carrier chain support-structure assemblies 50 are illustrated as being in various positions. FIGURE 6 shows the two assemblies 50 separated preparatory to receiving a log. In FIGURE 7 it is seen that the carrier assemblies at the intake end are positioned close to each other while the carrier assemblies at the discharge end are spaced apart from each other. The carrier assemblies in FIGURE 8 at the intake end are spaced apart from each other while the carrier assemblies at the discharge end are positioned close to each other. These figures illustrate that it is possible for the carrier chains 120 at one end of the feed table to grip or hold onto a log while the carrier chains at the other end of the feed table to be free of the log.

In FIGURE 9 the carrier assemblies 50 are shown as positioned close to each other with the carrier plates 130 of the opposed chains 120 in an overlapping relation. With a small log the carrier plates 50 may have to overlap each other or overlap the center line of the feed table to firmly position the small log.

In FIGURES 13 and 14 there is illustrated a positioning means 218 for varying the position of the support table 32. In each of the legs 34 there is positioned a tapped keeper 220. In this tapped keeper there is a screw shaft 222. This screw shaft 222 screws into a tapped hub of a sprocket 24. The sprocket 224 is journaled on a pedestal 226. A chain 228 connects with all four of the sprockets 24. The driving means for the chain 228 comprises a sprocket 230 mounted on a shaft 232. The shaft 232 is an output shaft of motor 234. The motor 234 is mounted on a movable platform 236. The movable platform 236 is mounted on a stationary platform 238 having two spaced-apart rails 240. The stationary platform 238 is positioned on feet 242. On the two front pedestals there are two sprockets 243. These sprockets are idler sprockets. On the stationary platform 238 there is a tapped keeper 244.

A screw shaft 246 is screwed through the keeper 244 and connects with the movable platform 236. It is seen that it is possible to vary the tension on the chain 228 by varying the position of the screw shaft 246 with respect to the keeper 244 and the movable platform 236.

The positioning means 218 makes it possible to vary the position of the feed table 30 so as to accommodate various sized logs and, also, for different pieces of subsequent processing equipment. In certain instances it may be desirable to feed a log of a circular diameter or a log having a peculiar curve or peculiar deformity to subsequent processing equipment. If the elevation of the feed table 30 were fixed with respect to the subsequent processing equipment, it might not be possible to feed this particular log. But, by being able to vary the elevation or the position of the feed table 30 with respect to the subsequent processing equipment, it may be possible to feed the log.

It is to be realized that the feed table 30 may be positioned at substantially any desired position. Normally, the feed table 30 will be positioned on a floor and with the carrier chains horizontal. However, it is to be realized that the feed table may be positioned on a vertical wall or on a horizontal support, but suspended from the horizontal support, or at any position between being upright on a floor or suspended from a horizontal support. The position of the feed table is secondary and the means for moving the log to the feed table can be designed or varied so as to realize the maximum possible potential of the feed table.

It is to be realized that in place of the sector gear 70 there may be employed other means for assuring that the carrier chain support-structure assemblies 50 will move toward and way from each other so as to maintain the carrier chains equidistant from the center line of the machine regardless of the opening between the carrier chains. In FIGURES 24 and 25 there is illustrated a chain drive assembly 250 in FIGURES 27, 28, and 29 there is illustrated a rack drive assembly 52 for maintaining the carrier chain support-structure assemblies equidistant from the center line of the machine.

In FIGURES 24 and 25 it is seen that on each end of the shaft 42 that there is an end plate 254 which depends below the shaft 42. On the end plate 254 there is welded an outwardly directed plate 256. Attached to the upper surface of the plate 256 is a bearing 258 having a shaft 260. On the shaft 260 there is attached a sprocket 262. On the cylindrical member 46 there is a new anchor plate 264 having a base 266 and two upwardly directed legs 268. In each of the legs 268 there is a passageway and there is positioned a turnbuckle stub 270 having a threaded end. This turnbuckle stub 270 is positioned by means of nuts 272 on each side of the legs 268. There is attached to each turnbuckle stub a chain 274. In FIGURE 25 it is seen that on one of the turnbuckle stubs 270 that there is a chain 274 which runs around the sprocket 262 and to the inner turnbuckle stub 270 on the other cylindrical member 46. Likewise, on the other cylindrical member 46 there is attached to the outer turnbuckle stub a chain 274 which runs around the sprocket 262 and attaches to the inner turnbuckle stub 270 on the first cylindrical member 46. From the foregoing it is seen that as the carrier chain support-structure assemblies 50 move toward and away from each other on the shaft 42 that the chains 274 assist in maintaining these assemblies 50 equidisant from the center line of the machine.

In FIGURES 27, 28, and 29 there is illustrated a rack drive assembly 252. On the end of the shaft 42 there is an end plate 254 which may be welded to U-channel member 38. On the lateral support 36 there may be positioned two upright channel members 280. On each of the channel members there may be an opening 282. As is illustrated in FIGURE 29, this opening 282 is substantially square. It is seen that there is positioned a U-base member 284 between the channel members 280. Positioned underneath the base 286 of support 284 is a plate support 288. In the base of the member 284 and also on the plate support 286 there is a passageway. In this passageway there is positioned a shaft 290. On the shaft 290 there is a bearing 292, and a pinion gear or spur gear 294. It is seen that the pinion gear 294 meshes with two racks 296. On the upper surface of 286 there are welded two spaced-apart angle irons 298. In FIGURES 28 and 29 it is seen that these angle irons 298 act as guides for the racks 296. One end of each rack is free while the other end of each rack is attached to a turnbuckle stub 300. The turnbuckle stub 300 passes through a passageway in a plate anchor 302. The plate anchor 302 connects or is welded to tubular member or cylindrical member 44. The turnbuckle stub 300 is threaded and on each side of the anchor 302 there are nuts 304.

From the preceding it is seen that as the carrier chain support-structure assemblies 50 move toward and away from each other that they are maintained an equidisant from the center line by means of the rack 296 and the pinion 294.

In FIGURE 26 there is illustrated a modification in the lift pad 200. On the upper surface of the circular plate 206 there is positioned a lock stopper 310 having a base 312 and two downwardly inwardly directed sides 314 which form a V. The lock stopper 310 assists in positioning the logs between the carrier chain assemblies 50. The log is allowed to fall between the carrier chain assemblies 50 or else is pushed between the two assemblies and is positioned by the V of the lock stopper 310.

It is to be realized that the feed table 30 may be employed for articles other than logs. A log has been used as an illustration as it represents one class of materials which may be handled by the feed table. However, this feed table may handle other articles such as a cylindrical article or a rod or a tubular article. It is to be understood that the cross-sectional configuration of the article being handled by the feed table may vary within each particular article and from article to article. The type of article being handled by the feed table will be determined by the processing equipment which follows the feed table.

What I claim is:
1. A feed table, said feed table comprising:
   (a) two carrier chain support-structure assemblies;
   (b) a first chain on each of said assemblies;
   (c) means to move said first chains;
   (d) means to move said assemblies relative to each other;
   (e) said means to move said first chain comprising a motor, a first sprocket, a second sprocket and a second chain;
   (f) said motor being in a driving relation with first sprocket;
   (g) said second chain connecting said first and second sprockets;
   (h) said first sprocket being in a driving relation with said second sprocket;
   (i) said second sprocket being in a driving relation with the first chain; and
   (j) means to maintain the second sprocket and the first sprocket at a fixed distance with respect to each other.
2. A feed table, said feed table comprising:
   (a) two carrier chain support-structure assemblies;
   (b) a first chain on each of said assemblies;
   (c) means to move said first chains;
   (d) means to move said assemblies relative to each other;
   (e) said means to move said first chains comprising a motor, a first sprocket, a second sprocket and a second chain;
   (f) said motor being in a driving relation with first sprocket;
   (g) said second chain connecting said first and second sprockets;
   (h) said first sprocket being in a driving relation with said second sprocket;

(i) said second sprocket being in a driving relation with the first chain;
(j) means to maintain a second sprocket and the first sprocket at a fixed distance with respect to each other; and
(k) means between the motor and the first sprocket to drive the first sprocket at a substantially constant speed.

3. A feed table, said feed table comprising:
(a) two carrier chain support-structure assemblies;
(b) a first chain on each of said assemblies;
(c) means to move said assemblies relative to each other;
(d) means connecting with each assembly to position each assembly a set distance from the centerline of the feed table;
(e) a guide means;
(f) said assemblies being mounted on said guide means;
(g) means to move said first chain comprising a motor, a first sprocket, a second sprocket, and a second chain;
(h) said motor being in a driving relation with said first sprocket;
(i) said second chain connecting said first and second sprockets;
(j) said first sprocket being in a driving relation with said second sprocket;
(k) said sprocket being in a driving relation with the first chain;
(l) means to maintain the second sprocket and the first sprocket at a fixed distance with respect to each other;
(m) means between the motor and the first sprocket to drive the first sprocket at a substantially constant speed;
(n) a means positioned between the two support-structure assemblies to position an object between the two assemblies;
(o) said support-structure assemblies being mounted on a support table; and
(p) means to vary the distance between the support table and a base.

4. A feed table, said feed table comprising:
(a) two carrier chain support-structure assemblies;
(b) a first chain on each of said assemblies;
(c) said first chain having links and a carrier plate on some of the links;
(d) two fluid actuated cylinders in a spaced-apart relation with each other connecting with the two support-structure assemblies to move said assemblies;
(e) two sets of sector gears;
(f) each set of sector gears comprising two sector gears with each sector gear of said set connecting with one of said support-structure assemblies;
(g) said two sector gears in a set meshing with each other;
(h) two spaced-apart guide members;
(i) said guide members being positioned generally laterally with respect to the support-structure assemblies;
(j) said support-structure assemblies being mounted on said guide members;
(k) means to move said first chain, said means comprising a motor, a first sprocket, a second sprocket, and a second chain;
(l) said motor being in a driving relation with said first sprocket;
(m) said second chain connecting said first and second sprockets;
(n) said first sprocket being in a driving relation with said second sprocket;
(o) said sprocket being in a driving relation with the first chain;
(p) means to maintain the second sprocket and the first sprocket at a fixed distance with respect to each other;
(q) means between the motor and the first sprocket to drive the first sprocket at a substantially constant speed;
(r) said motor being mounted on a movable platform so as to be able to move relative to a support-structure assembly;
(s) three lifting pads positioned between the two support-structure assemblies to position an object between the two assemblies;
(t) said lifting pads being in a substantially straight line and in a spaced-apart relation;
(u) said support-structure assemblies being mounted on a support table;
(v) means to vary the position of the support table with respect to a base;
(w) a pneumatic system connecting with said two fluid actuated cylinders;
(x) said pneumatic system comprising a source of gas, a pressure regulator and a receiver; and
(y) the pressure regulator maintaining the pressure in the receiver at a somewhat lower pressure than the pressure at the source of gas.

5. A combination of elements for handling material, said combination comprising:
(a) two carrier chain support-structure assemblies;
(b) a chain on each of said assemblies;
(c) means to move said chain;
(d) means to move said assemblies relative to each other;
(e) said means to move said chain comprising a motor, a first sprocket, a second sprocket and a second chain;
(f) said motor being in a driving relation with said first sprocket;
(g) said second chain connecting said first and second sprockets;
(h) said first sprocket being in a driving relation with said second sprocket;
(i) said second sprocket being in a driving relation with the first chain; and
(j) means to maintain the second sprocket and the first sprocket at a fixed distance with respect to each other.

6. A combination of elements for handling material, said combination comprising:
(a) two carrier chain support-structure assemblies;
(b) a chain on each of said assemblies;
(c) means to move said chain;
(d) means to move said assemblies relative to each other;
(e) said means to move said chain comprising a motor, a first sprocket, a second sprocket and a second chain;
(f) said motor being in a driving relation with said first sprocket;
(g) said second chain connecting said first and second sprockets;
(h) said first sprocket being in a driving relation with said second sprocket;
(i) said second sprocket being in a driving relation with the first chain;
(j) means to maintain the second sprocket and the first sprocket at a fixed distance with respect to each other; and
(k) means between the motor and the first sprocket to drive the first sprocket at a substantially constant speed.

7. A combination of elements for handling material, said combination comprising:
(a) two carrier chain support-structure assemblies;
(b) a first chain on each of said assemblies;
(c) means to move said assemblies relative to each other;

(d) means connecting with each assembly to position each assembly a set distance from the centerline of the feed table;
(e) a guide means;
(f) said assemblies being mounted on said guide means;
(g) means to move said first chain comprising a motor, a first sprocket, a second sprocket and a second chain;
(h) said motor being in a driving relation with said first sprocket;
(i) said second chain connecting said first and second sprockets;
(j) said first sprocket being in a driving relation with said second sprocket;
(k) said sprocket being in a driving relation with the first chain;
(l) means to maintain the second sprocket and the first sprocket at a fixed distance with respect to each other;
(m) means between the motor and the first sprocket to drive the first sprocket at a substantially constant speed;
(n) a means positioned between the two support-structure assemblies to position an object between the two assemblies;
(o) said support-structure assemblies being mounted on a support table; and
(p) means to vary the position of the support table with respect to a base.

8. A feed table, said feed table comprising:
(a) two carrier chain support-structure assemblies;
(b) a chain on each of said assemblies;
(c) means to move said chain;
(d) means to move said assemblies relative to each other;
(e) a guide;
(f) two tie-down members on the guide;
(g) each of said assemblies connecting with a tie-down member; and
(h) a chain connecting the two tie-down members to position each assembly a set distance from the centerline of the feed table.

9. A feed table, said feed table comprising:
(a) two carrier chain support-structure assemblies;
(b) a chain on each of said assemblies;
(c) means to move said chain;
(d) means to move said assemblies relative to each other;
(e) a guide;
(f) two tie-down members on the guide;
(g) each of said assemblies connecting with a tie-down member;
(h) a rack connecting with each tie-down member and directed toward the other tie-down member;
(i) a pinion gear; and
(j) said pinion gear meshing with each rack to assist in positioning each assembly a set distance from the centerline of the feed table.

10. A feed table, said feed table comprising:
(a) two carrier chain support-structure assemblies;
(b) a first chain on each of said assemblies;
(c) means to move said assemblies relative to each other;
(d) a guide means;
(e) tie-down members on said guide means;
(f) said assemblies being mounted on said tie-down members;
(g) a pair of two mating sector gains to position each assembly a set distance from the centerline of the feed table;
(h) one end of each sector gear connecting with one of said assemblies;
(i) the other end of each sector gear associated with the guide means;
(j) means to move said first chain comprising a motor, a first sprocket, a second sprocket, and a second chain;
(k) said motor being in a driving relation with said first sprocket;
(l) said second chain connecting said first and second sprockets;
(m) said first sprocket being in a driving relation with said second sprocket;
(n) said sprocket being in a driving relation with the first chain;
(o) means to maintain the second sprocket and the first sprocket at a fixed distance with respect to each other;
(p) means between the motor and the first sprocket to drive the first sprocket at a substantially constant speed;
(q) a means positioned between the two support-structure assemblies to position an object between the two assemblies;
(r) said support-structure assemblies being mounted on a support table; and
(s) means to vary the position of the support table with respect to a base.

11. A feed table, said feed table comprising:
(a) two carrier chain support-structure assemblies;
(b) a first chain on each of said assemblies;
(c) means to move said assemblies relative to each other;
(d) a guide means;
(e) tie-down members on said guide means;
(f) said assemblies being mounted on said tie-down members;
(g) a chain connecting two tie-down members on a guide means to position each assembly a set distance from the center-line of the feed table;
(h) means to move said first chain comprising a motor, a first sprocket, a second sprocket, and a second chain;
(i) said motor being in a driving relation with said first sprocket;
(j) said second chain connecting said first and second sprockets;
(k) said first sprocket being in a driving relation with said second sprocket;
(l) said sprocket being in a driving relation with the first chain;
(m) means to maintain the second sprocket and the first sprocket at a fixed distance with respect to each other;
(n) means between the motor and the first sprocket to drive the first sprocket at a substantially constant speed;
(o) a means positioned between the two support-structure assemblies to position an object between the two assemblies;
(p) said support-structure assemblies being mounted on a support table; and
(q) means to vary the position of the support table with respect to a base.

12. A feed table, said feed table comprising:
(a) two carrier chain support-structure assemblies;
(b) a first chain on each of said assemblies;
(c) means to move said assemblies relative to each other;
(d) a guide means;
(e) tie-down members on said guide means;
(f) said assemblies being mounted on said tie-down members;
(g) a rack connecting with one of the tie-down members on the guide means and directed toward the other tie-down member on the guide means;
(h) a pinion gear;
(i) said pinion gear meshing with each rack on the guide means to assist in positioning each assembly a set distance from the centerline of the feed table;
(j) means to move said first chain comprising a motor, a first sprocket, a second sprocket, and a second chain;
(k) said motor being in a driving relation with said first sprocket;
(l) said second chain connecting with first and second sprockets;
(m) said first sprocket being in a driving relation with said second sprocket;
(n) said sprocket being in a driving relation with the first chain;
(o) means to maintain the second sprocket and the first sprocket at a fixed distance with respect to each other;
(p) means between the motor and the first sprocket to drive the first sprocket at a substantially constant speed;
(q) a means positioned between the two support-structure assemblies to position an object between the two assemblies;
(r) said support-structure assemblies being mounted on a support table; and
(s) means to vary the position of the support table with respect to a base.

References Cited

UNITED STATES PATENTS

| | | | |
|---|---|---|---|
| 699,133 | 5/1902 | Allis | 198—162 |
| 3,184,040 | 5/1965 | Barnett | 198—165 |
| 2,135,806 | 11/1938 | Fermann | 198—165 |
| 2,679,924 | 6/1954 | Powell | 198—165 |
| 2,706,034 | 4/1955 | Russell | 198—204 |
| 2,725,168 | 11/1955 | Lindstaedt | 198—165 |
| 2,853,725 | 9/1958 | Schoenberger | 198—165 |

RICHARD E. AEGERTER, *Primary Examiner.*

EVON C. BLUNK, *Examiner.*

A. C. HODGSON, *Assistant Examiner.*